US008837386B2

(12) United States Patent
Ekici et al.

(10) Patent No.: US 8,837,386 B2
(45) Date of Patent: Sep. 16, 2014

(54) APPLICATION-BASED WIRELESS DEVICE INITIATED RADIO RESOURCE MANAGEMENT

(75) Inventors: Ozgur Ekici, Ottawa (CA); Muhammad Khaledul Islam, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 561 days.

(21) Appl. No.: 12/829,472

(22) Filed: Jul. 2, 2010

(65) Prior Publication Data

US 2012/0002614 A1    Jan. 5, 2012

(51) Int. Cl.
*H04W 72/04* (2009.01)
*H04W 48/18* (2009.01)
*H04W 88/06* (2009.01)

(52) U.S. Cl.
CPC ............. *H04W 48/18* (2013.01); *H04W 88/06* (2013.01)
USPC ............ 370/329; 370/310; 370/320; 370/230

(58) Field of Classification Search
CPC ...... H04W 48/18; H04W 28/16; H04W 88/06
USPC .......................... 370/310, 328, 329, 320, 230
See application file for complete search history.

(56) References Cited

U.S. PATENT DOCUMENTS

2007/0115816 A1* 5/2007 Sinivaara ..................... 370/230
2007/0129045 A1  6/2007 Aerrabotu

FOREIGN PATENT DOCUMENTS

| EP | 2175672 A1 * | 4/2010 |
| WO | 2005006127 A1 | 6/2005 |
| WO | 2008155290 A1 | 12/2008 |

OTHER PUBLICATIONS

European search report from corresponding EP application, Dec. 2010.

* cited by examiner

*Primary Examiner* — Un C Cho
*Assistant Examiner* — Siming Liu
(74) *Attorney, Agent, or Firm* — Gowling Lafleur Henderson LLP

(57) ABSTRACT

A method and apparatus for radio resource management in a wireless device is provided. A type of data connection to be established between the wireless device and a network is determined. A radio resource capability mode for the data connection based on resource requirements of the determined type of data connection is dynamically determined wherein the radio resource capability mode is selected from a plurality of radio resource capability modes operable by the wireless device within wireless technologies supported by the network. The determined radio resource capability mode is conveyed to the network during connection establishment between the wireless device and the network, wherein the radio resource capability mode is used by the network to determine radio resources to be allocated to the wireless device for the connection.

23 Claims, 8 Drawing Sheets

APPLICATION-BASED WIRELESS DEVICE INITIATED RADIO RESOURCE MANAGEMENT

TECHNICAL FIELD

The present disclosure relates to wireless devices and in particular to improving performance of a wireless device by managing required radio resources allocated by a wireless network.

BACKGROUND

With the deployment of networks that use third generation (3G) and fourth generation (4G) wireless technologies such as the $3^{rd}$ Generation Partnership Project (3GPP) defined Wideband Code Division Multiple Access (WCDMA), High Speed Packet Access (HSPA) and Long Term Evolution (LTE), wireless mobile devices, such as smart phones, can operate at a wide range of data rates based on the capability of the network and the device. Wireless devices that provide wireless communications capabilities, such as mobile devices, personal digital assistants, smart phones, handheld computers, tablet computers, and fixed or integrated wireless systems are referred to herein as User Equipment (UE). The initial version of 3GPP WCDMA, also known as 3GPP release 99, provided a maximum uplink and downlink data rate of 384 kbps. A new downlink shared channel called High Speed Downlink Packet Access (HSDPA) was introduced in 3GPP release 5 to increase the peak downlink date rate to 14 Mbps. The uplink data rate is improved by introduction of Enhanced Dedicated Channel (E-DCH) also known as High Speed Uplink Packet Access (HSUPA) in 3GPP release 6 where uplink data rates of 5.7 Mbps is attainable. Both uplink and downlink data rates were increased further in 3GPP release 7 via higher order modulation—the peak downlink and uplink rates being 21 Mbps and 11.5 Mbps respectively. As of Release 9, there are 28 HSDPA UE categories while HSUPA provides 9 different categories with each UE category providing a particular maximum data rate or range of data rates. The allocation of maximum radio resources by the network depends on a number of criteria—one being the capability of the UE (e.g. if UE supports just R99 feature set, R99+HSDPA or R99+HSDPA+HSUPA) and UE category (e.g. HSDPA category 8, HSUPA category 6) that device UE indicates to the network. The allocation of radio resources which is deemed as unnecessarily high for the requirements of underlying application or data connection can lead to needlessly high consumption of device resources on the UE, inefficient usage of network resource or unacceptable quality-of-service (QoS) for a given application.

Accordingly, a method and apparatus that enables improved performance in wireless devices by requesting suitable radio resources for a given connection remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
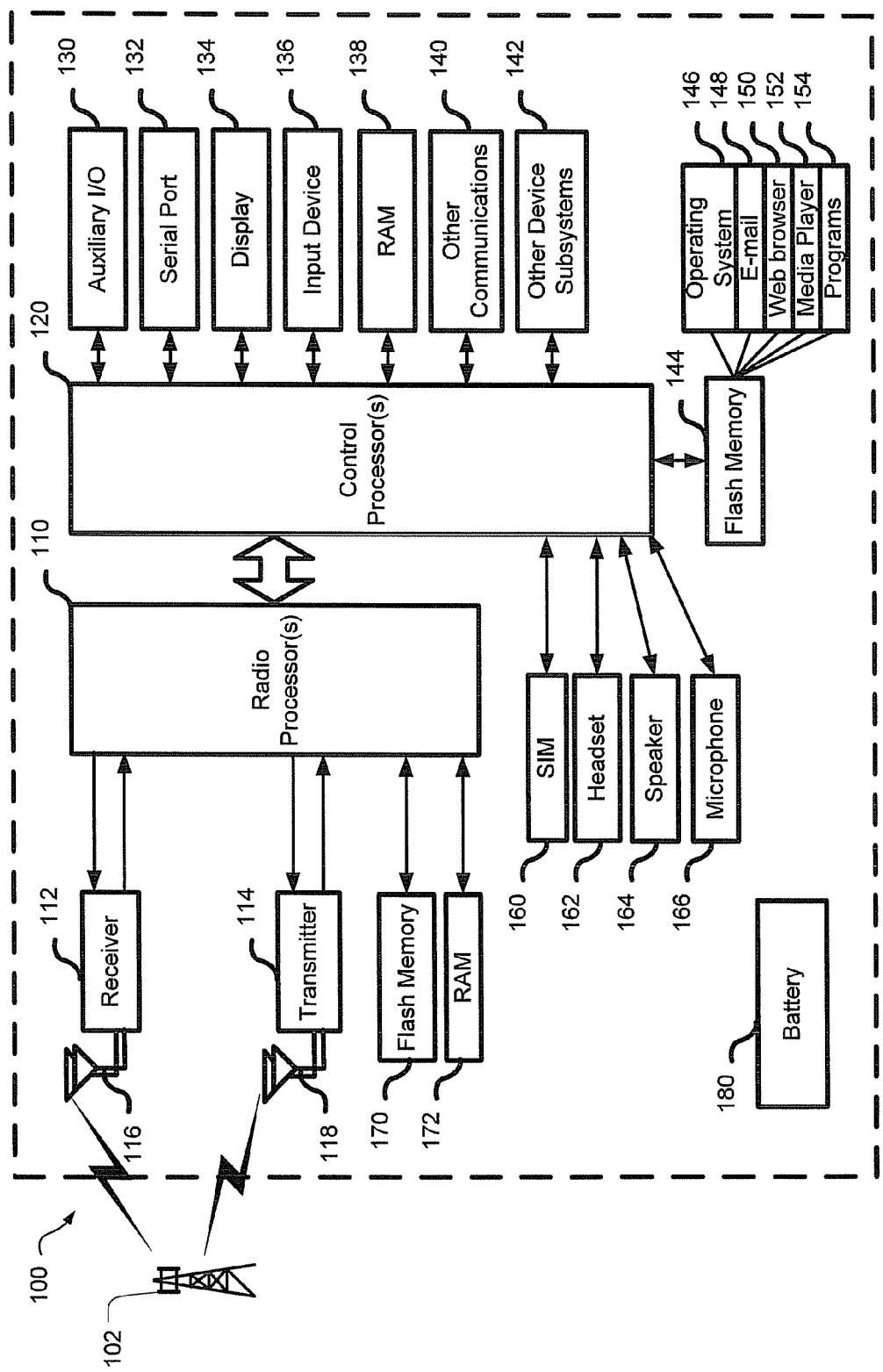
FIG. 1 shows a schematic representation of a wireless device.

Embodiments are described below, by way of example only, with reference to FIGS. 1-8.

In accordance with present disclosure there is provided a method of radio resource management in a wireless device operable on a wireless technology. The method executed in a processor of the wireless device comprising determining a type of data connection to be established between the wireless device and a network; determining dynamically a radio resource capability mode for the data connection based on resource requirements of the determined type of data connection, wherein the radio resource capability mode is selected from a plurality of radio resource capability modes operable by the wireless device within the wireless technologies supported by the network; and conveying the determined radio resource capability mode to the network during connection establishment between the wireless device and the network, wherein the radio resource capability mode is used by the network to determine radio resources to be allocated to the wireless device for the connection.

In accordance with present disclosure there is also provided an apparatus operable on a wireless technology. The apparatus comprising: a processor and a memory. The memory comprising instructions for determining a type of data connection to be established between the wireless device and a network; determining dynamically a radio resource capability mode for the data connection based on resource requirements of the determined type of data connection, wherein the radio resource capability mode is selected from a plurality of radio resource capability modes operable by the wireless device within the wireless technologies supported by the network; and conveying the determined radio resource capability mode to the network during connection establishment between the wireless device and the network, wherein the radio resource capability mode is used by the network to determine radio resources to be allocated to the wireless device for the connection.

In accordance with the present disclosure there is also provided a computer readable memory containing instructions for execution by a processor in a wireless device. The instructions providing determining a type of data connection to be established between the wireless device and a network; determining dynamically a radio resource capability mode for the data connection based on resource requirements of the determined type of data connection, wherein the radio resource capability mode is selected from a plurality of radio resource capability modes operable by the wireless device within wireless technologies supported by the network; and conveying the determined wireless device radio resource capability mode to the network during connection establishment between the wireless device and the network, wherein the radio resource capability mode is used by the network to determine radio resources to be allocated to the wireless device for the connection.

In the present disclosure methods and an apparatus for wireless devices are provided to improve wireless device performance including but not limited to reduced resource consumption such as battery, better Quality-of-Service (QoS) support, lower tariff etc. . . . The method and apparatus, by taking into account the requirements of an application or applications running on the mobile device, reduce battery usage and can improve QoS support at the beginning of the data transaction by avoiding assignment of needless radio resources that are costly to maintain (i.e. needs more power) and might not guarantee a certain QoS profile to the device.

Higher data rate technologies (e.g. HSDPA/HSUPA/LTE) are desirable to be used for data intensive applications such as large file download/upload since duration of data exchange with high data rate will be significantly shorter in comparison to transferring the same amount of data using a technology that is not capable of providing the same high data rate (e.g. 3GPP release 99 WCDMA which is referred herein a legacy technology). Additionally or alternatively, the use of legacy technologies may result in an unacceptable user experience, i.e. taking too long for a file to be downloaded or uploaded.

When the connection to be established by the UE is for an application that typically needs low data rate and short connection duration (i.e. e-mail, sync), high data rate technologies provide less of an advantage in terms of transfer time while resulting in a relatively higher cost of battery resource. Optimal battery performance can be achieved by using radio resource management techniques on the UE that attempt to match the radio resources to the application requirements under defined application usage scenarios.

When the connection to be established by the UE is for an application that typically needs continuous and guaranteed average data rate, high data rate technologies (e.g. HSUPA) might not satisfy the QoS requirement. Despite technologies like HSUPA, HSDPA being capable of providing very high data rates, network might sporadically throttle the data rates for extended duration of time due to serving wireless cells running its own radio resource management algorithm (e.g. for HSUPA, it could be increased uplink interference). This would lead to unacceptable service quality to the end user. For instance a video call in packet domain would require a steady data rate of 128 kbps on both uplink and downlink. In this circumstances a wireless device could provide better service in R99 radio mode rather than HSUPA for guaranteed average data rate.

When a subscriber's data usage approaches its subscribed data plan limit, the wireless device might prefer to establish a connection that is less data rate intensive (legacy technology) rather than advanced radio features like HSDPA and HSUPA. It is because most of the wireless application on the market use variable rate codecs which adapt the data rate up or down to your bandwidth. So it will expand the bandwidth whenever available. As an example, whenever a wireless device is assigned a high data rate channel (e.g. HSUPA) then the application providing video services can detect the available bandwidth and rather than streaming a regular quality videos it will re-tune the codec to provide high definition (HD) video; which eventually will cost more to the end user if s/he is close to his/her subscribed quota.

If an application on the UE does not require high data rates (e.g. email, calendar), then time required to exchange data using a legacy technology as the transport may not result in a degraded user experience. Advantageously, the use of such legacy technologies (e.g. 3GPP release 99) for the data connections of such applications can offer better performance. The network, which is responsible for radio resource allocation to UEs, is typically not aware of the type of application that is active at a given time or its requirement for data rate except for some Quality of Service (QoS) parameters which is typically established at the time of Packet Data Protocol (PDP) activation. However, the same PDP connection is typical used by multiple applications on the UE each having its own data rate requirements. Only the UE has the knowledge of data rate or quality of service needs of a connection to be established for each application. For instance, for mobile originated connections, the device knows that the connection request is for e-mail application or for a file download via File Transfer Protocol (FTP). To have better battery performance as well as not to consume unnecessary network radio resources, the UE may decide to conceal its higher data rate capabilities from the network during connection establishment based upon underlying profile of the application. By dynamically modifying the UE's high data rate capabilities, either by conveying a different mode (e.g. indicating to be R99 mode rather than R99+HSDPA+HSUPA capable) and/or different device category within a mode (e.g. indicating to be HSDPA category 11 rather than category 10), the UE implicitly forces the network not to allocate unnecessary high data rate resources; by doing so, UE can operate at a data rate which still meets the requirements of the application, but, results in less drain on the battery and provides improved QoS, as well as efficient use of network resources.

The 3GPP Release 9 specification defines 28 different HSDPA categories defining UE physical and MAC layer capabilities. The following table is derived from table 5.1a of the release 9 version of 3GPP TS 25.306 and shows maximum speeds of different device categories and by what combination of features they are achieved.

TABLE 1

HSDPA User Categories

| Category | Modulation | MIMO - Dual Carrier | Max. data rate [Mbit/s] |
| --- | --- | --- | --- |
| 1 | QPSK and 16-QAM | | 1.2 |
| 2 | QPSK and 16-QAM | | 1.2 |
| 3 | QPSK and 16-QAM | | 1.8 |
| 4 | QPSK and 16-QAM | | 1.8 |
| 5 | QPSK and 16-QAM | | 3.6 |
| 6 | QPSK and 16-QAM | | 3.6 |
| 7 | QPSK and 16-QAM | | 7.2 |
| 8 | QPSK and 16-QAM | | 7.2 |
| 9 | QPSK and 16-QAM | | 10.1 |
| 10 | QPSK and 16-QAM | | 14.0 |
| 11 | QPSK only | | 0.9 |
| 12 | QPSK only | | 1.8 |
| 13 | QPSK, 16-QAM and 64-QAM | | 17.6 |
| 14 | QPSK, 16-QAM and 64-QAM | | 21.1 |
| 15 | QPSK, 16-QAM | MIMO | 23.4 |
| 16 | QPSK, 16-QAM | MIMO | 27.9 |
| 19 | QPSK, 16-QAM | MIMO | 35.3 |
| 20 | QPSK, 16-QAM, 64-QAM | MIMO | 42.2 |
| 21 | QPSK, 16-QAM | Dual-Cell HSDPA | 23.4 |
| 22 | QPSK, 16-QAM | Dual-Cell HSDPA | 27.9 |
| 23 | QPSK, 16-QAM, 64-QAM | Dual-Cell HSDPA | 35.3 |

TABLE 1-continued

HSDPA User Categories

| Category | Modulation | MIMO - Dual Carrier | Max. data rate [Mbit/s] |
|---|---|---|---|
| 24 | QPSK, 16-QAM, 64-QAM | Dual-Cell HSDPA | 42.2 |
| 25 | QPSK, 16-QAM | Dual-Cell HSDPA + MIMO | 46.8 |
| 26 | QPSK, 16-QAM | Dual-Cell HSDPA + MIMO | 55.9 |
| 27 | QPSK, 16-QAM, 64-QAM | Dual-Cell HSDPA + MIMO | 70.6 |
| 28 | QPSK, 16-QAM, 64-QAM | Dual-Cell HSDPA + MIMO | 84.4 |

A wireless device that is capable of HSDPA may also be capable of HSUPA that has improved uplink data rates. HSUPA, also known as Enhanced Dedicated Channel (E-DCH), supports 9 categories up to a range of 11.5 Mbits/s uplink data rate.

TABLE 2

HSUPA User Categories

| Category | Max. data rate [Mbit/s] | Support of 2 ms and 10 ms TTI |
|---|---|---|
| 1 | 0.73 | 10 |
| 2 | 1.46 | 2 and 10 |
| 3 | 1.46 | 10 |
| 4 | 2.93 | 2 and 10 |
| 5 | 2.00 | 10 |
| 6 | 5.76 | 2 and 10 |
| 7 | 11.5 | 2 and 10 |
| 8 | 5.76 | 2 |
| 9 | 11.5 | 2 |

The 3GPP Release 5 specification relevant to HSDPA does not provide any specific mechanism for a UE to control its use of HSDPA resources. Once the UE has informed the network that it supports HSDPA and conveys the associated category, the network dictates the connection characteristics and can assign higher-than-needed data rate for a given application. There is no mechanism for the UE to request non-HSDPA transport bearer. The 3GPP specifications provide for the UE to inform the network of its HSDPA support and category through the use of non-critical extensions to the radio resource control (RRC) messages used to setup and maintain RRC connections and Radio Bearers. A non-HSDPA, R99 UE, will not implement these extensions when sending the RRC messages but will maintain full R99 functionality on a Release 5 network that also provides service to R99 wireless devices.

While initiating a connection, the UE, or more specifically the application manager component of UE software, is aware of the application that has triggered the radio connection and its actual or estimated radio resource needs. Therefore during connection establishment, the UE can direct the network to only assign resources appropriate to suit the usage requirements by modifying its capability information. This mechanism of dynamic conveyance of capability is beneficial for both the network and the UE; the network can save its scarce resource (radio capacity which is typically the bottle neck considering end-to-end connection) and the device saves its precious battery resources providing longer battery life. Additionally, in case the resource requirement that was initially assumed to be low turns into a data rate intensive link, the connection state (i.e. UE capability) can be changed on the fly (during already established link) or a new connection can be established using additional network resources utilizing the full capabilities of the UE. The resource requirements may periodically change at known or unknown frequencies depending on the end-user data profile. For example, an email application may normally use a low data rate; however may require an increase in resource requirements while downloading an email attachment, which can occur at unknown times. Additionally or alternatively, an application that downloads a video or music once a week may require additional resources at known intervals or frequencies, or may benefit from resources with a possibly lower throughput but improved QoS. The UE can modify its HSDPA and HSUPA capability (or HSDPA/HSUPA category) during connection establishment by using existing mechanisms defined in 3GPP specifications such as sending a layer 3 message that includes "UE capability indication" or "physical channel capability" information element with the desired value.

By taking advantage of backwards compatibility requirements between technologies, such as HSDPA to R99, the UE can manipulate its request of HSDPA allocation according to the requirements of the currently active application(s). This manipulation involves the handheld establishing RRC connections and Radio Bearers either with or without the non-critical extensions depending on whether the current application requires the use of HSDPA for an acceptable user experience. For example, a simple short e-mail exchange is unlikely to benefit from HSDPA whereas streaming or large e-mail attachment download would. This manipulation of the connection characteristics can occur on a per Radio Bearer and/or RRC connection establishment. Furthermore, a new connection can be established or already existing connection could be augmented, with differing characteristics, whenever the resource requirements change. As such, a mixed usage scenario, where the UE temporarily switches from a low data rate to a high data rate is possible.

FIG. 1 is a block diagram of a wireless device 100 incorporating a communication subsystem having both a receiver 112 and a transmitter 114 for performing modulation and demodulation, as well as associated components such as one or more embedded or internal antenna elements 116 and 118, and a radio processor(s) 110 which may include one or more digital signal processors or application specific integrated circuits for performing decoding and encoding functions. The particular design of the communication subsystem will be dependent upon the communication network in which the UE is intended to operate in a WCDMA networks with HSDPA and HSUPA support. However the disclosure is equally applicable to other radio resource management techniques, in WCDMA (e.g. MIMO and dual cell HSDPA transmission) and any high data rate wireless communication network that provide backward capability to legacy or lower data rate standard.

The wireless device 100 performs synchronization, registration or activation procedures by sending and receiving communication signals over a radio frequency (RF) channel from a base station 102 as part of a wireless network. Downlink signals received by one or more antennas 116 through communication network 100 are input to receiver 112, which may perform such common receiver functions as signal amplification, frequency down conversion, filtering, channel selection and the like, and for example analog to digital (ND) conversion. ND conversion of a received signal allows more complex communication functions such as demodulation, decoding and synchronization to be performed in a digital signal processor (DSP). Decoding may utilize any type of forward error correction (FEC) decoder, such as for example but not limited to Turbo codes, low-density parity-check codes (LDPC), or convolutional codes may be used in the decoding process.

In a similar manner, signals to be transmitted are processed, including modulation and encoding for example, by a DSP and input to transmitter 114 for digital to analog conversion, frequency up conversion, filtering, amplification and transmission over the communication network via one or more antennas 118. The radio processor(s) 110 not only process communication signals, but also provides for receiver and transmitter control. One or more DSPs are located on radio processor(s) 110. Radio processor(s) 110 interacts with receiver 112 and transmitter 114, and further with flash memory 170, random access memory (RAM) 172 and performs network communication functions.

Control processor(s) 120 interacts with further device subsystems such as the display 134, flash memory 144, random access memory (RAM) 138, auxiliary input/output (I/O) subsystems 130, serial port 132, input device(s) 136, subscriber identity module 160, headset 162, speaker 164, microphone 166, other communications devices 140 and other device subsystems generally designated as 142. Data is provided to and received from radio processor(s) 110 to control processor(s) 120.

Some of the subsystems shown in FIG. 1 perform communication-related functions, whereas other subsystems may provide "resident" or on-device functions. Notably, some subsystems, such input devices 136 and display 134, for example, may be used for both communication-related functions, such as entering a text message for transmission over a communication network, and device-resident functions such as a calculator or task list. The input devices 136 may comprise but not be limited to keyboard, trackball, thumbwheel or touch screen.

Software used by radio processor(s) 110 and control processor(s) 120 may be stored in a persistent store such as flash memory 162 and 144, which may alternatively be a read-only memory (ROM) or similar non-volatile storage element (not shown). It will be appreciated that the operating system, specific device applications, or parts thereof, may be temporarily loaded into a volatile memory such as RAM 160 and RAM 138. Received communication signals may also be stored in RAM 160.

As shown, flash memory 144 can be segregated into different areas for programs, operating system 146, e-mail client 148, web browser 150, media player 152 and other functionality or programs generally 154. These different storage types indicate that each program can allocate a portion of flash memory 144 for their own data storage requirements. Control processor(s) 120, in addition to its operating system functions, preferably enables execution of software applications on the mobile wireless device.

For voice communications, overall operation of wireless device 100 is similar, except that received signals would preferably be output to the speaker 164 or headset 162 and signals for transmission would be generated by the microphone 166. Other device subsystems 140, such as a short-range communications subsystem, is a further optional component which may provide for communication between wireless device 100 and different systems or devices, which need not necessarily be similar devices. For example, the subsystem 140 may include an infrared device and associated circuits and components or a Bluetooth™ communication module to provide for communication with similarly enabled systems and devices. The wireless device is powered by battery 180 which provides power to the components described above.

Figure 2:
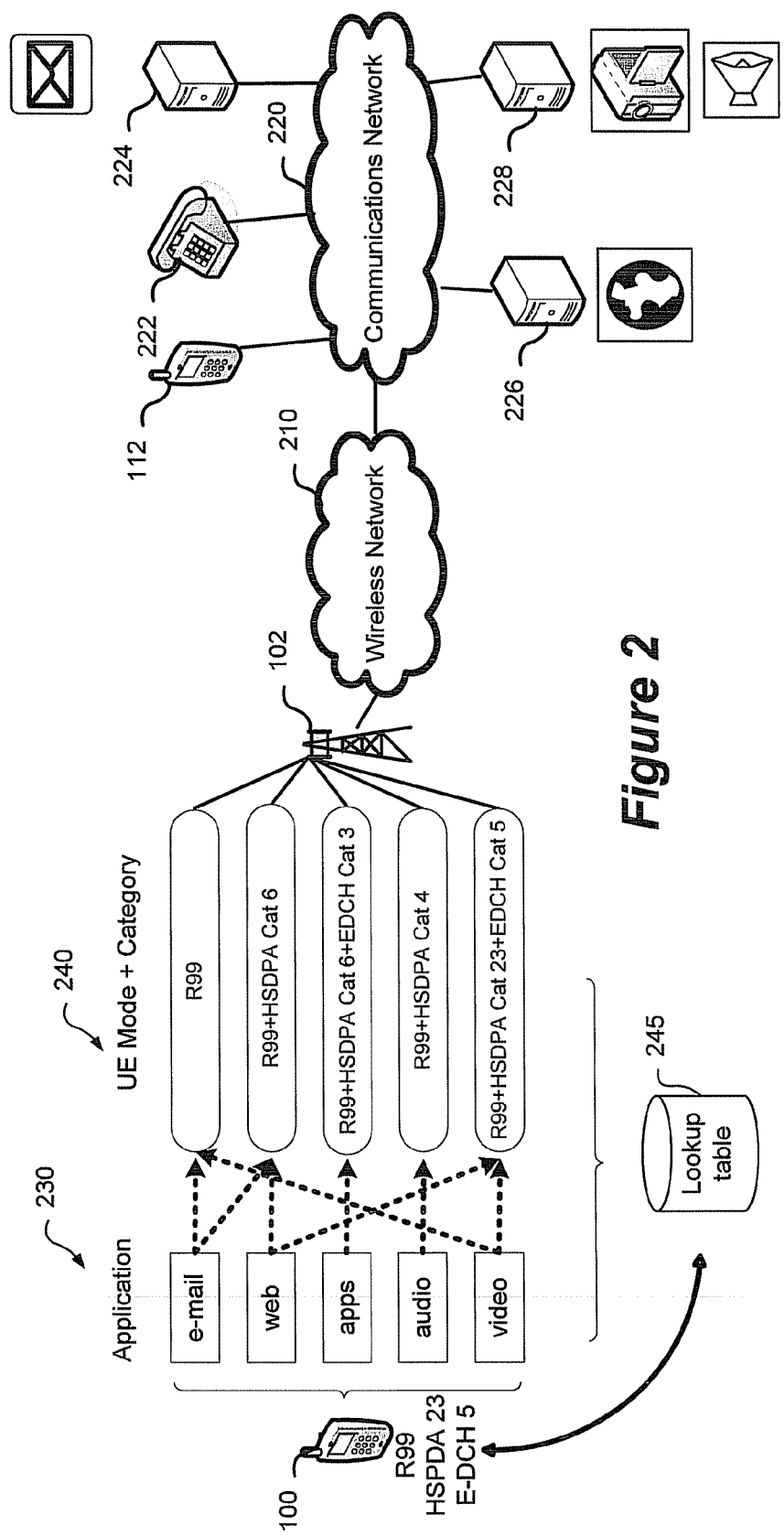
FIG. 2 shows a representation of wireless device based radio resource management.

FIG. 2 shows a representation of application based radio resource management. In this example, the wireless device 100 (or UE) has a maximum capability such as defined by HSDPA category 23 and E-DCH (HSUPA) category 5. The mode of operation of the device (i.e. R99, HSDPA, HSDPA+ HSUPA) and/or the capability category of the connection is selected by the UE based on the resource requirements of the application or applications executing on the device. The device may know the actual resource requirements of the application, for example an application that downloads a specified amount of data each day, or it may infer or estimate the resource requirements based one or more factors, including but not limited to for example the application type, the day of the week, the time of day, application usage history and/or patterns, access history, etc. The application may include and not limited to, for example an e-mail application, a web browser, an application requiring data access, a media player capable of downloading audio or video files etc. Additionally or alternatively the mode may be selected based upon the type of request generated by the application, for example, while an e-mail application may use a low data rate category, the resource requirements may be determined by the application itself, or by the operating system processing application connection requests by inspecting connection calls from the application. For example, a news application can synchronize the latest news in text format which would not need a lot of resources; at the same time the same news application can request a download of video news podcast that would require high radio resources.

An e-mail application for example may only require a lower data rate connection as provided by R99 WCDMA mode, however the download and/or upload of attachments may benefit from a higher data rate such as HSDPA category 8 downlink and HSUPA category 5 uplink data speeds. For regular email downloads, the UE can conserve battery power by concealing it's possible operating capability and initiating a connection identifying the UE mode as R99 and therefore only requiring limited resources. The network then allocates resources to the device based upon the devices capability indication. The lower data rate provided by radio mode such as R99 typically requires less power on the device. This is due the fact that the R99 mode uses less uplink channels comparison to HSUPA mode or lower data rate applications uses a modulation scheme that requires less transmission power for a given bit error probability (i.e. QPSK modulation is more robust than 16-QAM for a given power level per transmitted information bit). As such, when application requirements are compatible with the lower data rate, the wireless device can conserve power consumption and/or provide improved QoS by masquerading as a lower category/radio mode device.

The determination of the resource requirements of the UE may also be made based upon a typical data rate or buffer size of a connection associated with an application, or multiple applications 230 if network access is being performed concurrently. Each application may be assigned to one or more radio modes (e.g. R99, R99+HSDPA, R99+HSDPA+ HSUPA) and/or UE categories (e.g. HSDPA category 6) 240 based upon typical resource requirements for the application 230. Each mode/category corresponds to a buffer requirement on the device based upon the uplink data rate. The higher the data rate capability, the larger the buffer size required. In addition, where an application is mapped to more than one category, the selection of the current category may be based upon the last used category for the application based upon previous usage requirements. In addition, the application may distinguish the type of content and the required resources based upon associated QoS requirements. For example the downloading of a video file for non-realtime playback may require considerable resources but have low QoS, where as streaming video in a video chat application utilizing lower resources may provide improved QoS to ensure the real-time conversation is maintained. The request, including the selected mode and/or category is transmitted to base station 102 and relayed to the wireless network 210. Based upon the request, the wireless network will then allocate appropriate resources to the device. The request may also be based upon the destination associated with the connection generated by the application. For example, if the connection is a voice call to a device such as another wireless device 112 or landline 222 a low data rate connection may only be required and would be initiated such as R99. Applications may access services provided by a communication network 220 coupled to the wireless network 210. A web browser application accessing a web server 226 or a media player accessing a multimedia server 228 would each have associated device modes or categories that are utilized when a connection is initiated.

In determining the resource requirements, additional factors associated application may be taken into account For example, data limits or quotas based upon the subscribed data plan or time of day pricing may be utilized to limit resources required by the UE. Alternatively, if the UE exceeds a usage quota, resources may be selected to limit data requirements. The additional factors may be used in addition to the application requirements in determining the optimal network resources to provide adequate QoS, conserve wireless device resources or meet data package quota restraints. User plan or quota data may be tracked by the UE or requested periodically from the network.

The UE may have a look-up table 245 pre-configured and stored in memory such as 144 or 162 configured on the device, or a list can be pushed to the device by network operator, or the device can implement an intelligent algorithm that predicts the resource usage and requirements from previous data exchanges of a given application. The look-up table may associate resource requirements with an application, an application type, a request type, request destination, or other means for determining or estimating the resource requirements. The table can define for each application or connection type, criteria to choose different radio resource modes and/or UE categories). The look-up table may also provide further granularity as to the data to be transmitted in device buffer, the latency requirement of the data to be transmitted, or the data rate (throughput) requirement to determine the appropriate mode of operation.

Figure 3:
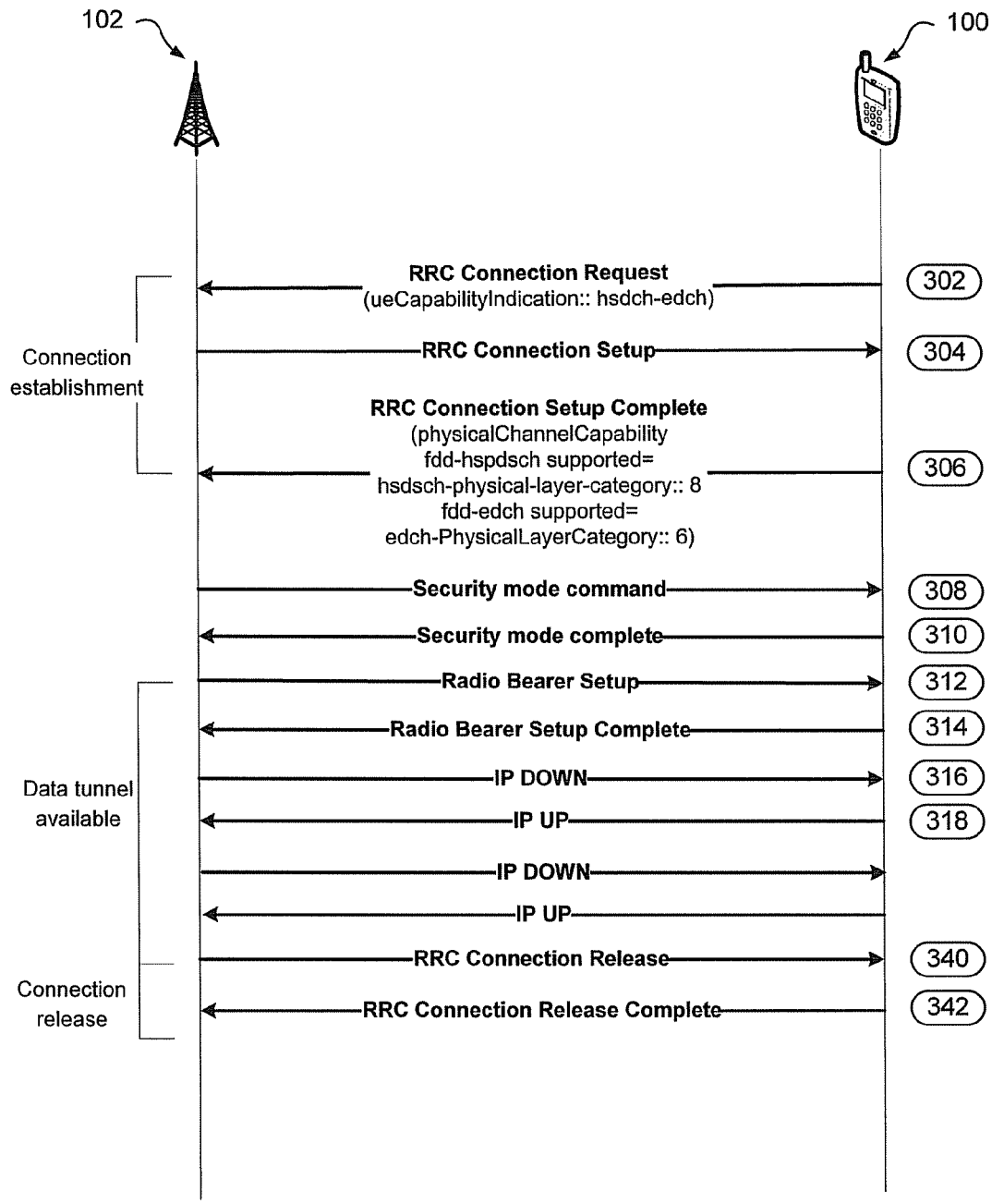
FIG. 3 shows a connection flow diagram for a single connection.

FIG. 3 shows a connection flow diagram. The connection establishment phase may be initiated by mobile originated packet connections based upon an outgoing application connection, such as sending an email or initiating a web session or by mobile terminated packet connections from the network, such as an incoming email, sync, weather updates or other push type data events. In a mobile terminated connection, the wireless device receives a Page message from the base station 102 indicating that data is pending for delivery to the device prior to establishment of a connection at 302. The device initiates the connection comprising a Radio Resource Control (RRC) Connection Request message 302 based upon the data requirements of an outgoing application or incoming data requirements. The connection request provides a capability indication of the device which is processed and an RRC Connection Setup message is sent back 304 to the device to acknowledge the connection request message from the device. The capability indication may be a legacy technology, such as R99. Based upon the application resource requirements, an appropriate mode, such as R99 or HSDPA or HSDPA and HSUPA is selected that provides a desired data rate.

An RRC Connection Setup Complete 306 message including UE category within the current technology that requires lower resource allocation than the full capability of the wireless device (i.e. HSDPA category 6 is reported to network despite HSDPA category 23 support of the wireless device) is provided to the network. A security mode command 308 is provided to the wireless device to ensure authentication with a Security mode complete 310 being provided by the wireless device.

A data tunnel is established by a Radio Bearer Setup 312 command to commence the data tunnel to identify allocated radio resources for the data tunnel. When the tunnel is initiated a Radio Bearer Setup Complete 314 command is returned from the UE to finalize the data connection establishment. IP data can then be exchanged between the network and the device 316/318 through the data tunnel until the connection is released by a RRC Connection Release 340 command from the base station. The connection release is completed with a return RRC Connection Release Complete 342 message from the UE. In a scenario where resource requirements change for an application, a new connection may be established based upon the new application requirements.

Figure 4:
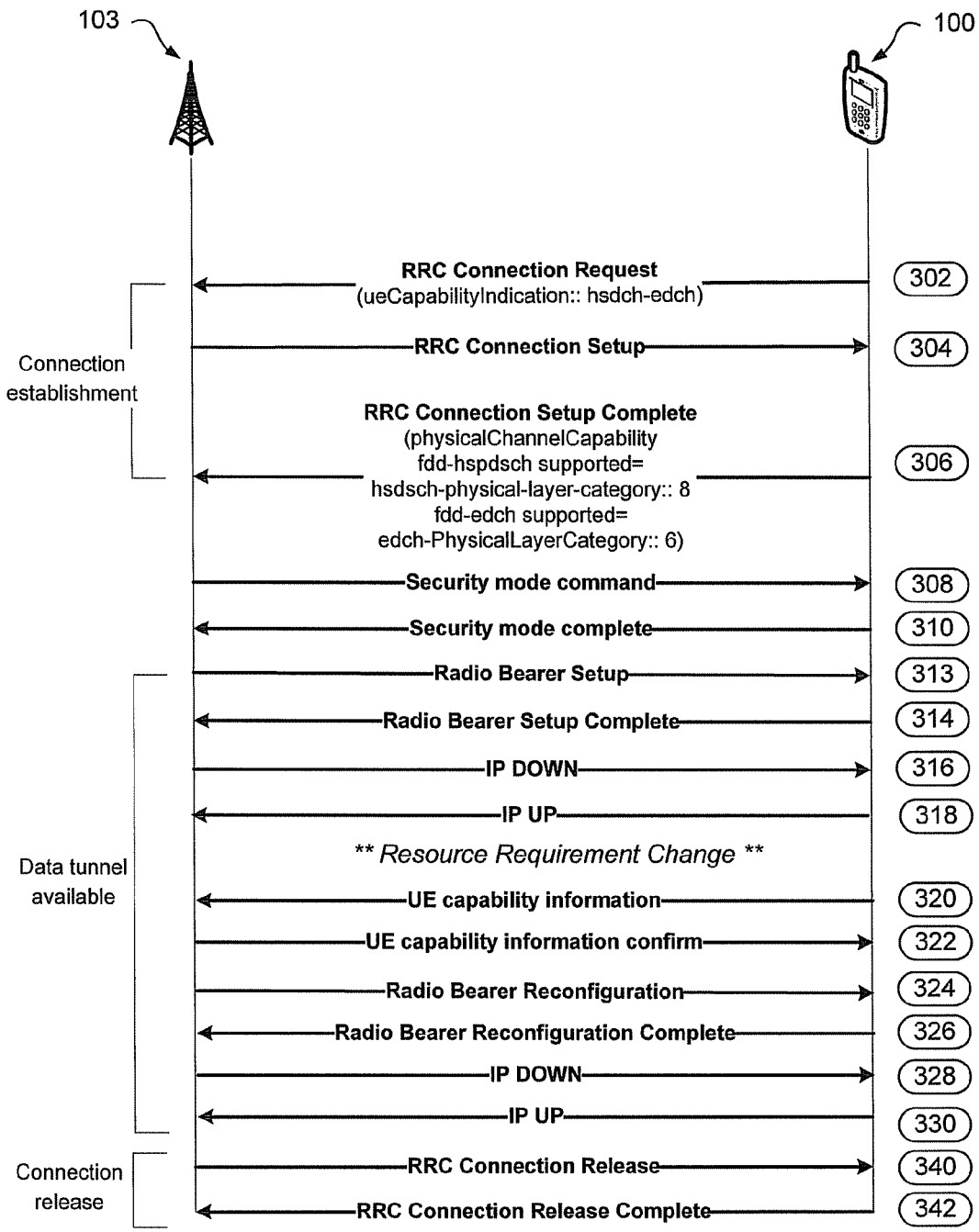
FIG. 4 shows a connection flow diagram when a resource requirement change occurs due to multiple connections attempts (i.e. a new connection request requiring different radio resources occurs in the middle of already established connection)

FIG. 4 shows a connection flow diagram with a radio resource requirement change is implemented. During data exchange through an established data tunnel a resource requirement change occurs either based upon a change of the application using the data connection or a change in the data requirements of the application itself, such as a request in a web browser to download video. The device determines a new radio mode and/or UE category is required. The UE capability information message 320 is sent from the device to the network. UE capability information confirm message 322 is sent to the device and additional resources are allocated by following radio bearer reconfiguration message exchange 324. The UE confirms this change with a radio bearer reconfiguration complete message 326. Data exchanged between the device through the tunnel, 328 and 330, will be provided at the higher data rate until the connection is released by a RRC Connection Release 340 command from the base station. The connection release is completed with a return RRC Connection Release Complete 342 message from the UE.

Figure 5:
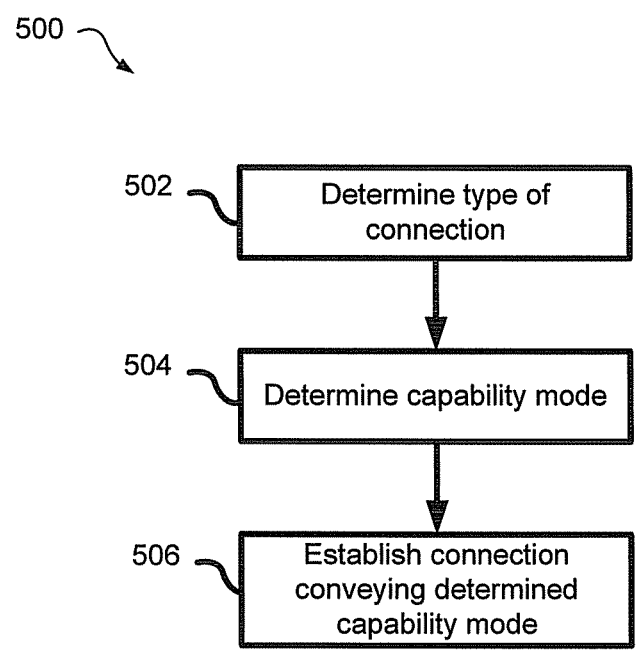
FIG. 5 shows a method for wireless device based radio resource management for single connection.

FIG. 5 shows a method 500 for wireless device based radio resource management for executing in a UE. As noted in FIG. 3, the connection request initiation may be based upon a mobile originated connection or a mobile terminated connection and can be determined 502. A UE radio resource capability mode for the UE can then be determined 504 based upon radio resource requirements of the connection and is sent to the network. The UE radio resource capability mode is selected from the UE radio resource capability modes that are operable by the UE within a wireless technology and supported by the network. The capability mode may be provided in one or more messages to the network by providing a capability indication associated with the capability mode and a separate UE category as described in FIGS. 3 and 4 or may be provided in a single message based upon the wireless technology utilized. The capability mode may be related to a legacy technology and/or a UE category defining resource requirements if operating within the same technology class. The connection with the network is then established 506 by conveying the determined UE radio resource capability mode to initiate the data tunnel. By enabling the UE to select a UE radio resource capability mode appropriate to the connection requirements, the UE conceals capabilities from the network enabling more efficient battery usage on the UE device. In contrast, in a typical network connection, the highest capability mode is automatically provided by the UE to provide the highest connection rate possible with the network regardless of the impact on the wireless device or QoS considerations relative to the device. The connection is maintained with data being exchanged between the device and the network until the connection is released. If the application requirements change during the connection, either by a change in data requirements from the application or a change in the application using the connection the session may be released and a new connection can be established with the network providing new UE capabilities.

Figure 6:
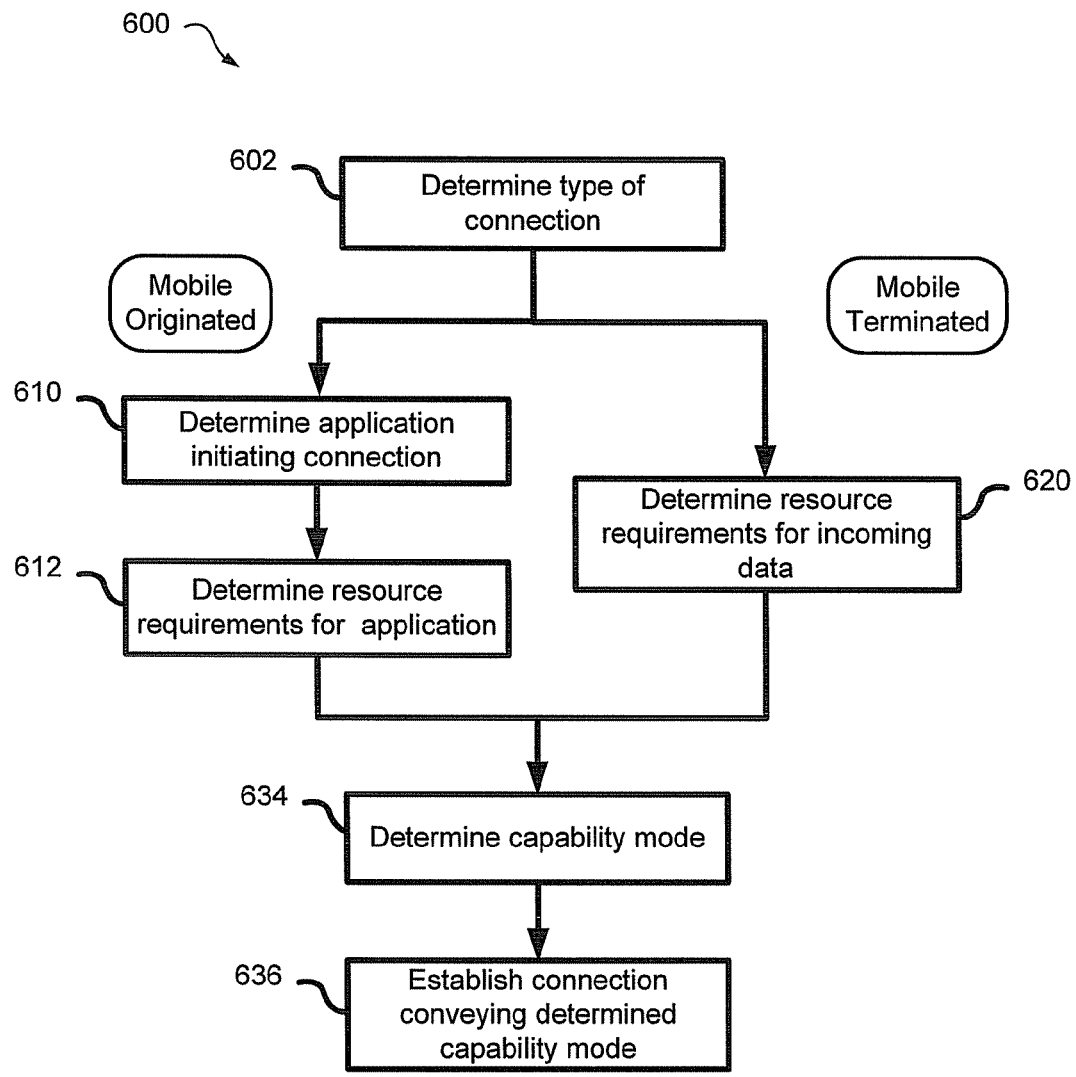
FIG. 6 shows a method for wireless device based radio resource management for single connection.

FIG. 6 shows a method 600 for wireless device based radio resource management in a UE. As noted in FIG. 3, the connection request initiation may be based upon a mobile originated connection or a mobile terminated connection and can be determined 602. For mobile originated connections, when the connection request is initiated, the application associated with the request is determined 610. Resource requirements of the application associated with the connection are dynamically determined 612. The determination of resource requirements can be performed by a table look-up function defining, for example, the application and an associated data rate. The determination of resource requirements may be further defined based upon one or more criteria such as battery power level thresholds, where the level of available power can impact the selection of resources; specific QoS requirements for different tasks or uses within the application, for example text based web browsing versus interactive video or interactive content browsing or small text emails versus emails with large attachments; or subscriber data usage limits or quotas associated with the data packages associated with the wireless device. For a mobile terminated connection, the type of connection is determined 620 based upon the most efficient UE radio resource capability mode for downloading incoming data from the network. This mode may be based upon a UE mode such as R99 or a UE mode and category combination that utilizes the least amount of resources or provides the most efficient operation of the UE for receiving data from the network. The determination of the type of connection, mobile originated or mobile terminated is based upon either an application initiating a connection or the receipt of a page request from the network to initiate the connection.

A UE radio resource capability mode can then be determined 634 based upon the radio resource requirements of the connection and is sent to the network. The capability mode may be provided in one or more messages to the network by providing a capability indication associated with the capability mode and a separate UE category as described in FIGS. 3 and 4 or may be provided in a single message based upon the wireless technology utilized. The capability mode may be related to a legacy technology and/or a UE category defining resource requirements if operating within the same technology class. The connection with the network is then established 636 by conveying the determined UE radio resource capability mode to initiate the data tunnel. The connection is maintained with data being exchanged between the device and the network until the connection is released. If the application requirements change during the connection, either by a change in data requirements from the application or a change in the application using the connection the session may be released and a new connection can be established with the network providing new UE capabilities.

Figure 7:
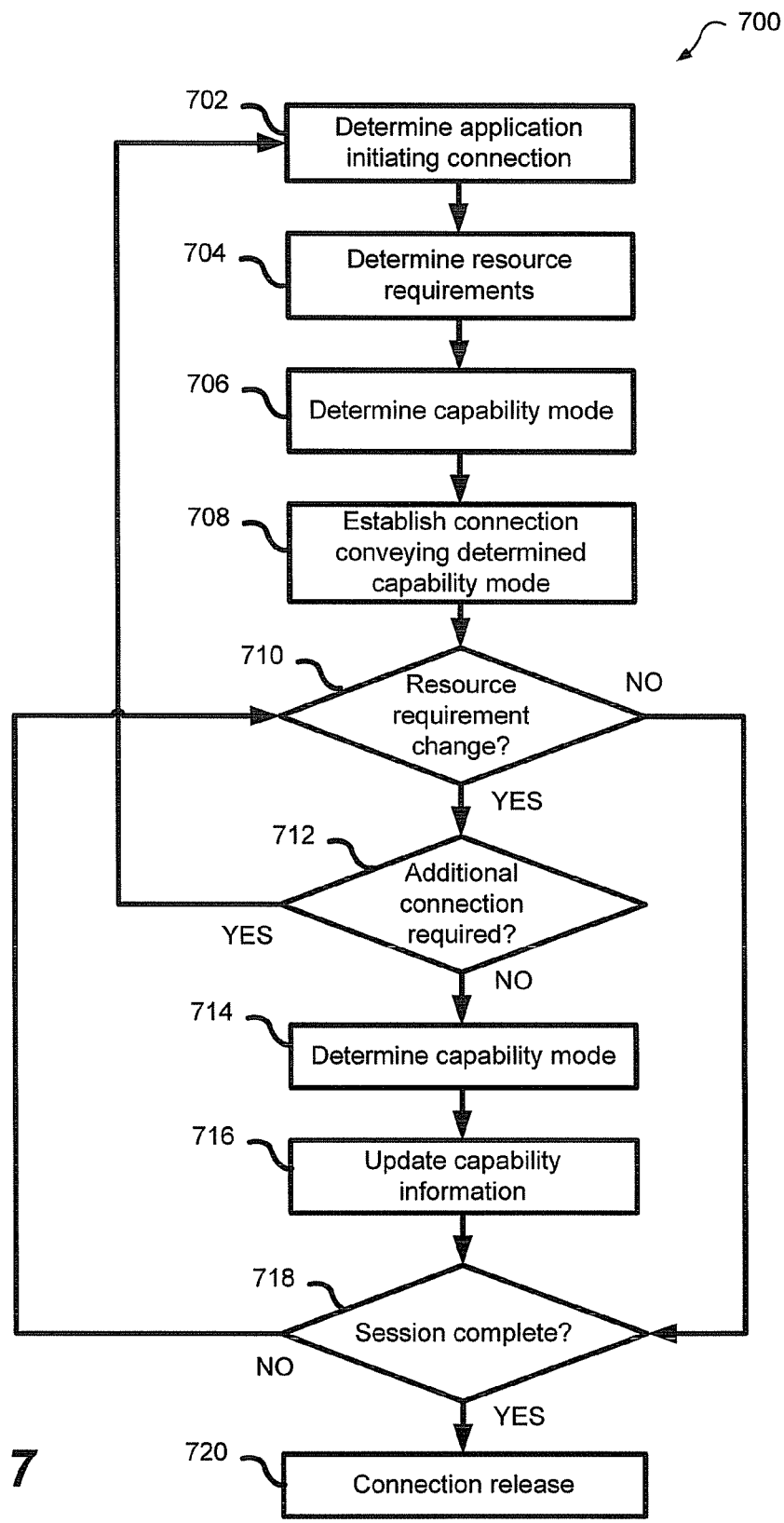
FIG. 7 shows a method for wireless device based radio resource management when a resource requirement change occurs due to multiple connection attempts.

FIG. 7 shows a method 700 for wireless device based radio resource management with a radio resource requirement change with a mobile originated connection. When a connection request is initiated, the application associated with the request is determined 702. As noted in FIG. 3, the connection request initiation may be based upon a mobile originated connection or a mobile terminated connection. Resources requirements of the application are determined 704. An associated UE radio resource capability mode is determined 706 that provides the determined resource requirements. A connection is established by conveying the determined capability mode 708. The capability mode may be related to a type of radio bearer (i.e. R99 WCDMA and HSDPA) and/or a UE category defining resource requirements if operating within the same technology class. Based upon the selected radio mode, a separate capability indication or category (within the indicated radio mode, for example category 6 for HSDPA) will be provided to the network. During the connection, if the resource requirements of the application changes, or the application being used changes due to, for example, initiating a video from within a web browser, switching from voice call to a video call, or downloading of a large email attachment, YES at 710, it is then determined if an additional connection is required to service the requirement change. If additional connections are required, YES at 712, a new connection can be created at 702. If no additional connections are required, NO at 712, the capability mode and/or category are determined for the new resource requirement 714. The updated capability requirements can be provided in a UE capability information message provided to the network 716. The network can then change the registered radio/category information of the UE and allocates resources to the UE. If the session is not complete, NO at 718, it can then be determined if additional resources are required at 710. If the session is complete, YES at 718, the connection is released at 720.

Figure 8:
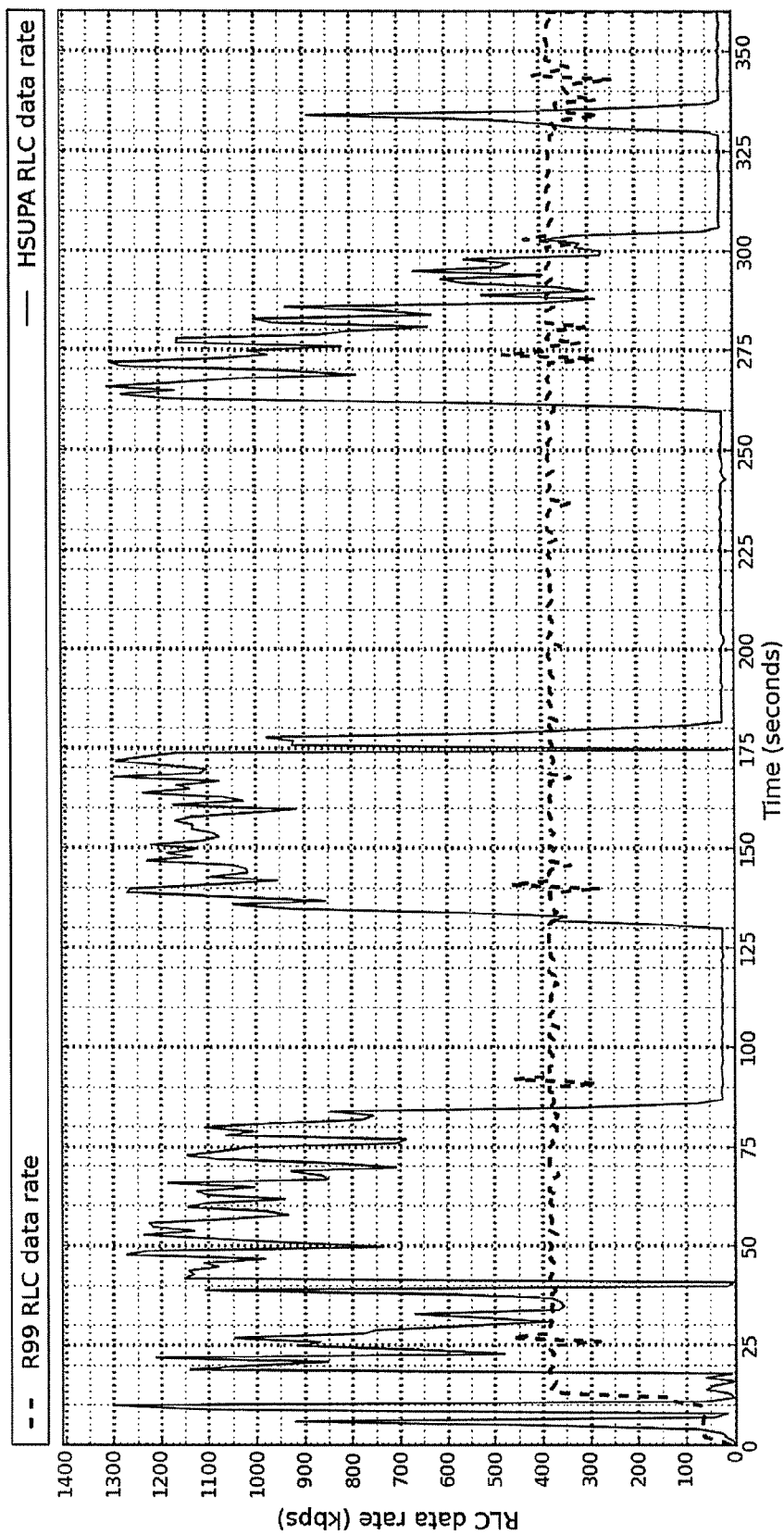
FIG. 8 shows a graph illustrating the performance of a wireless device to 3GPP rel 99 and 3GPP release 6 HSUPA radio modes.

FIG. 8 shows uplink data rate performance of a wireless device set to R99 and R6 HSUPA radio modes. The figure illustrates the choppy performance of R6 HSUPA relative to R99 and how a mobile device would benefit by utilizing R99 mode of operation for data sessions that requires continuous guaranteed average bit rate (e.g. Skype video call) to ensure consistent data rare performance.

Although the method and apparatus are described in relation to 3GPP R5/R6HSDPA/HSUPA and R99 WCDMA functionality, it is also applicable to other radio resource management techniques in 2G (Evolved EDGE) or 3G technologies and future 4G technologies providing backward compatibility to radio resource methods within the technology where potential power savings and QoS guarantee can be achieve by utilizing a backward compatible resource allocation methods. The device and methods according to the present disclosure may be implemented by any hardware, software or a combination of hardware and software having the above described functions. The software code, either in its entirety or a part thereof, may be stored in a computer-readable memory. Further, a computer data program representing the software code may be embodied on a computer-readable memory. Although the receiver is described in terms of units, the functions of the receiver may be integrated in to other components of the UE such as the receiver, decoder or radio processors.

While a method, apparatus and computer readable memory for wireless device based Radio Resource Management (RRM) for improved performance and QoS of the UE has been described herein, it will be appreciated by those skilled in the art that changes and modifications may be made thereto without departing from the disclosure.

The invention claimed is:

1. A method of radio resource management in a wireless device, using a wireless technology supported by a mobile network to establish a data connection thereto, the method comprising:
   determining at the wireless device a type of the data connection for mobile originated data connections or mobile terminated data connections to be established between the wireless device and the mobile network;
   determining dynamically at the wireless device a radio resource capability mode for the data connection based on resource requirements of the determined type of the data connection, wherein the radio resource capability mode is selected from a plurality of radio resource capability modes supported by the wireless device for the wireless technology to connect to the mobile network;
   conveying the determined radio resource capability mode selected from the plurality of radio resource capability modes from the wireless device to the mobile network during the data connection establishment between the wireless device and the mobile network, wherein the conveyed radio resource capability mode is used by the mobile network to assign radio resources to be allocated to the wireless device for the data connection; and
   deciding by the wireless device, when selecting radio resource capability mode to convey to the mobile network, whether the wireless device conceals one or more higher data rate radio resource capability modes of the plurality of radio resource capability modes from the mobile network to direct assignment of radio resources by the mobile network appropriate to suit usage requirements of the determined type of the data connection.

2. The method of claim 1 wherein the type of data connection is a mobile originated data connection, the method, prior to determining the radio resource capability mode, further comprises:
   determining one or more applications initiating the mobile originated data connection to the mobile network; and
   determining the resource requirements associated with the determined one or more applications.

3. The method of claim 2 wherein the resource requirements are determined based upon one or more applications executed on the wireless device and a type of information requested by the one or more applications from the mobile network.

4. The method of claim 3 wherein the resource requirements are further determined based upon one or more of criteria selected from the group comprising: a Quality of Service requirement associated with the type of information requested by the one or more applications from the mobile network; a battery power level, and a data limit or data quota associated with the wireless device.

5. The method of claim 3 further comprising performing a look-up in a table, stored in memory of the wireless device, to determine the mode of operation associated with an application wherein the look-up table also defines one or more categories associated with one or more of the modes of operation.

6. The method of claim 2 further comprising:
   determining a change in resource requirements of the determined one or more applications while using the established data connection;
   determining a second radio resource capability mode from the plurality of radio resource capability modes based on the change in resource requirements; and
   conveying a change mode request to the mobile network identifying a second radio resource capability mode to change the radio resources to be allocated to the wireless device for the data connection.

7. The method of claim 1 wherein when the type of data connection is a mobile terminated data connection determined by receiving a page request from the mobile network to initiate the data connection with the mobile network, the method further comprising determining the radio resource capability mode from the plurality of radio resource capability modes to utilize a minimum amount of radio frequency resources.

8. The method of claim 1 conveying radio resource capability (RRC) mode further comprises sending a RRC Connection Request identifying a capability indication associated with the radio resource capability mode, and in response to receiving a connection setup message, sending a category associated radio resource capability mode.

9. The method of claim 8 wherein the determined capability indication identifies 3GPP Wideband Code Division Multiple Access (WCDMA) compatibility and the wireless device is High Speed Downlink Packet Access (HSDPA) or High Speed Uplink Packet Access (HSUPA) capable.

10. The method of claim 9 wherein the one or more categories are selected from High Speed Downlink Packet Access (HSDPA) or High Speed Uplink Packet Access (HSUPA) UE categories.

11. The method of claim 1 further comprising:
   determining a change in resource requirements while using the established data connection;
   determining a second radio resource capability mode from the plurality of radio resource capability modes based on the change in resource requirements; and
   conveying a change mode request to the mobile network identifying a second radio resource capability mode to change the radio resources to be allocated to the wireless device for the data connection.

12. The method of claim 1 further comprising:
   determining a change in resource requirements while using the established data connection;
   determining if an additional data connection to the mobile network is required to service the change in resource requirements; and
   initiating a second data connection to the mobile network based upon the change in resource requirements.

13. The method of claim 1 further comprising:
   determining a change in resource requirements while using the established data connection;
   determining a second radio resource capability mode from the plurality of radio resource capability modes based on the change in resource requirements; and
   re-initiating the data connection using the second radio resource capability mode.

14. A wireless device for providing wireless communications with a wireless network, the wireless device comprising:
   a processor;
   a memory comprising instructions for:
   determining at the wireless device a type of a data connection for mobile originated data connections or mobile terminated data connections to be established between the wireless device and the mobile network;
   determining dynamically a radio resource capability mode for the data connection based on resource requirements of the determined type of the data connection, wherein the radio resource capability mode is selected from a plurality of radio resource capability modes supported by the wireless device for the wireless technology to connect to the mobile network;

conveying the determined radio resource capability mode selected from the plurality of radio resource capability modes from the wireless device to the mobile network during the data connection establishment between the wireless device and the mobile network, wherein the conveyed radio resource capability mode is used by the mobile network to assign radio resources to be allocated to the wireless device for the data connection; and deciding by the wireless device, when selecting radio resource capability mode to convey to the mobile network, whether the wireless device conceals one or more higher data rate radio resource capability modes of the plurality of radio resource capability modes from the mobile network to direct assignment of radio resources by the mobile network appropriate to suit usage requirements of the determined type of the data connection.

15. The apparatus of claim 14 wherein the type of data connection is a mobile originated data connection, the method, prior to determining the radio resource capability mode, further comprises:

determining one or more applications initiating the mobile originated data connection to the mobile network;

determining the resource requirements associated with the determined one or more applications.

16. The apparatus of claim 15 wherein the resource requirements are determined based upon one or more applications executed on the wireless device and a type of information requested by the one or more applications from the mobile network.

17. The apparatus of claim 16 wherein the resource requirements are further determined based upon one or more of criteria selected from the group comprising: a Quality of Service requirement associated with the type of information requested by the one or more applications from the mobile network; a battery power level, and a data limit or data quota associated with the wireless device.

18. The apparatus of claim 15 further comprising performing a look-up in a table, stored in memory of the wireless device, to determine a mode of operation associated with an application wherein the look-up table also defines one or more categories associated with one or more of the modes of operation.

19. The apparatus of claim 14 wherein when the type of data connection is a mobile terminated data connection determined by receiving a page request from the mobile network to initiate the data connection with the mobile network, the method further comprising determining the radio resource capability mode from the plurality of radio resource capability modes to utilize a minimum amount of radio frequency resources.

20. The apparatus of claim 14 conveying radio resource capability (RRC) mode further comprises sending a RRC Connection Request identifying a capability indication associated with the radio resource capability mode, and in response to receiving a connection setup message, sending a category associated radio resource capability mode.

21. The apparatus of claim 20 wherein the determined capability indication identifies 3GPP Wideband Code Division Multiple Access (WCDMA) compatibility and the wireless device is High Speed Downlink Packet Access (HSDPA) or High Speed Uplink Packet Access (HSUPA) capable.

22. The apparatus of claim 21 wherein the one or more categories are selected from High Speed Downlink Packet Access (HSDPA) or High Speed Uplink Packet Access (HSUPA) UE categories.

23. A non-transitory computer readable memory containing instructions for execution by a processor in a wireless device, using a wireless technology supported by a mobile network to establish a data connection thereto, the instructions providing:

determining at the wireless device a type of the data connection for mobile originated data connections or mobile terminated data connections to be established between the wireless device and the mobile network;

determining dynamically at the wireless device a radio resource capability mode for the data connection based on resource requirements of the determined type of the data connection, wherein the radio resource capability mode is selected from a plurality of radio resource capability modes supported by the wireless device for the wireless technology to connect to the mobile network;

conveying the determined radio resource capability mode selected from the plurality of radio resource capabilities capability modes from the wireless device the mobile network during data connection establishment between the wireless device and the mobile network, wherein the conveyed radio resource capability mode is used by the mobile network to assign radio resources to be allocated to the wireless device for the data connection; and deciding by the wireless device, when selecting radio resource capability mode to convey to the mobile network, whether the wireless device conceals one or more higher data rate radio resource capability modes of the plurality of radio resource capability modes from the mobile network to direct assignment of resources by the mobile network appropriate to suit usage requirements of the determined type of the data connection.

* * * * *